March 10, 1925.

D. J. STRICKLAND 1,529,452

MECHANISM FOR HANDLING BRICK MOLDS

Original Filed Oct. 6, 1919    9 Sheets-Sheet 1

Inventor
D. J. Strickland

By Krull, Smith, Brock & West
Atty's

March 10, 1925.

D. J. STRICKLAND 1,529,452

MECHANISM FOR HANDLING BRICK MOLDS

Original Filed Oct. 6, 1919 9 Sheets-Sheet 4

Inventor
D. J. Strickland

By Hull Smith Brock & West
Atty's

March 10, 1925.

D. J. STRICKLAND

MECHANISM FOR HANDLING BRICK MOLDS

Original Filed Oct. 6, 1919   9 Sheets-Sheet 5

1,529,452

Inventor
D. J. Strickland

By Hull Smith Brock & West
Atty's

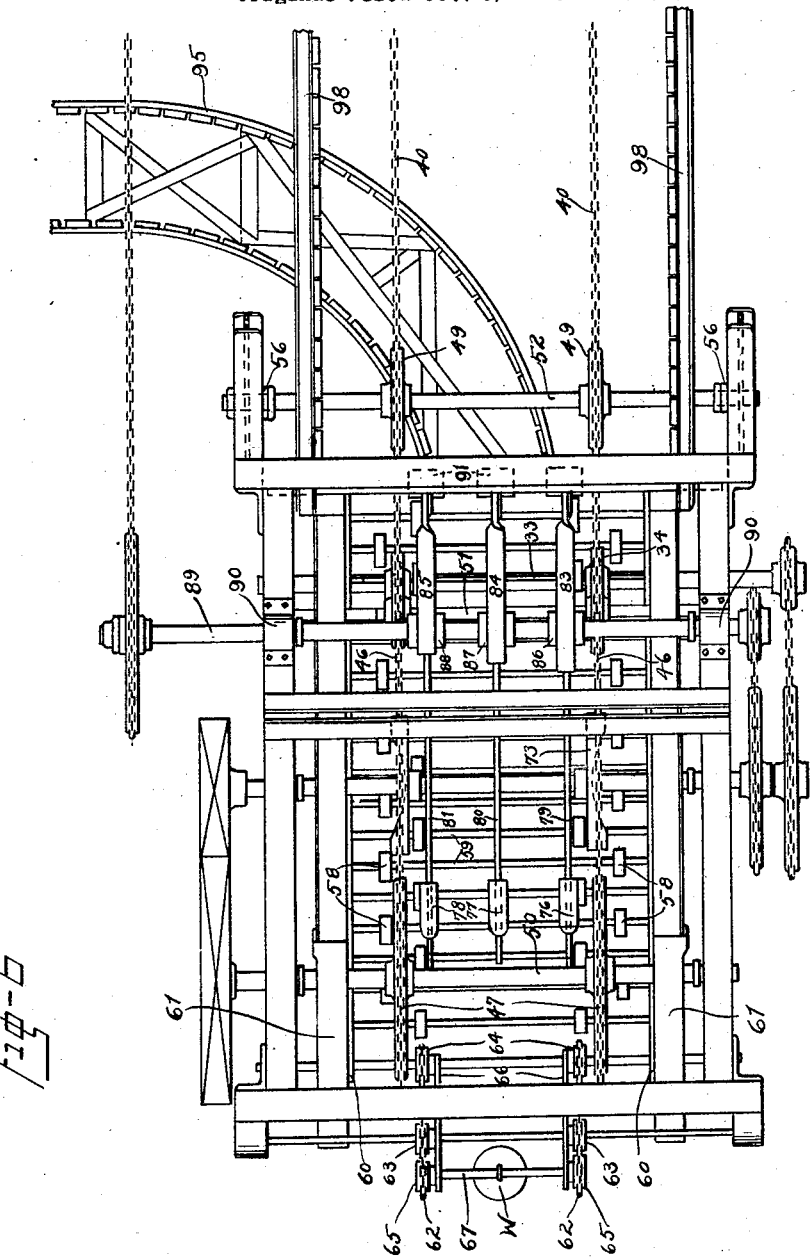

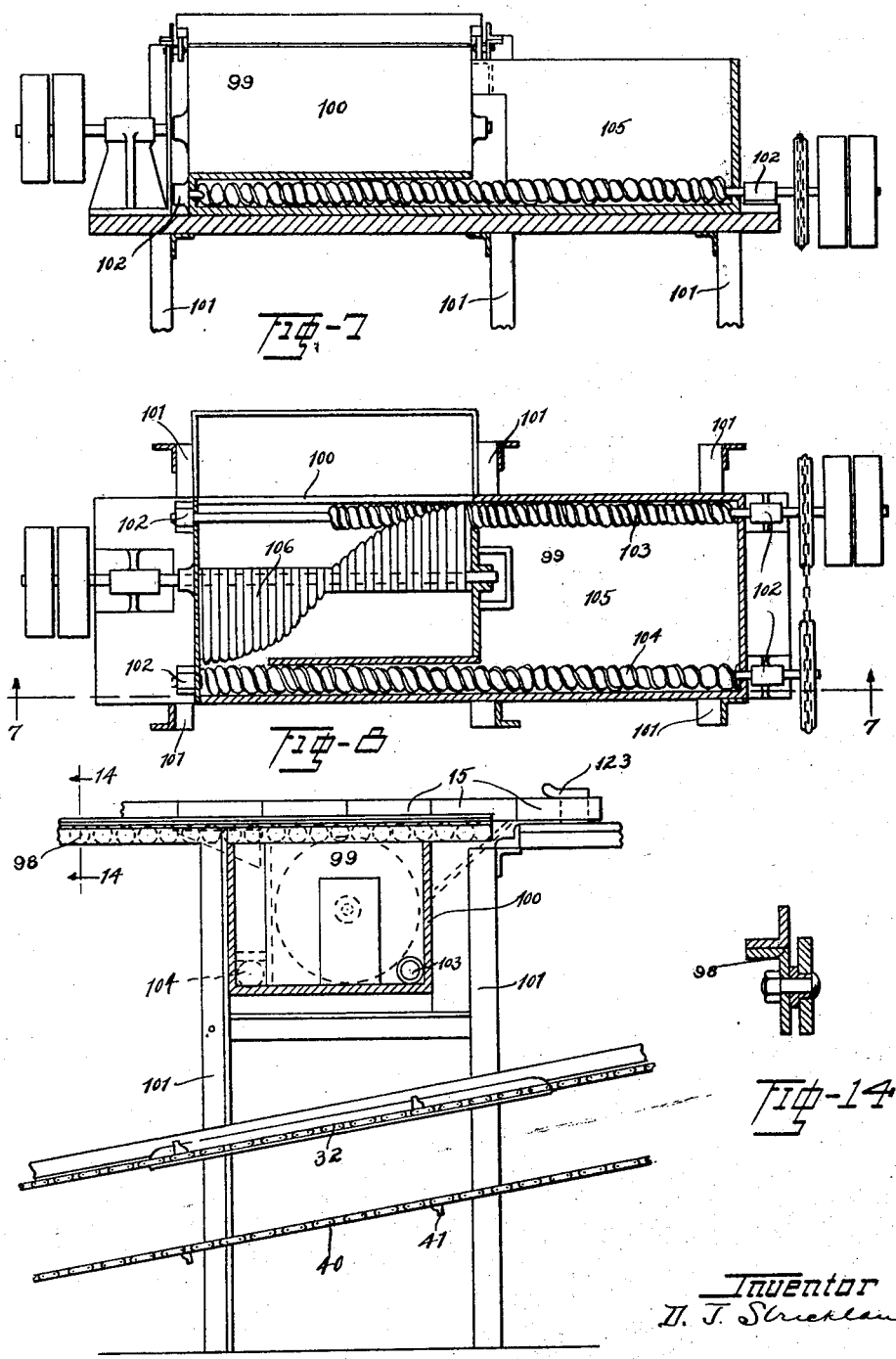

March 10, 1925.   1,529,452
D. J. STRICKLAND
MECHANISM FOR HANDLING BRICK MOLDS
Original Filed Oct. 6, 1919    9 Sheets-Sheet 8

Inventor
D. J. Strickland
By Hull Smith Brock &al
Atty's

March 10, 1925.
D. J. STRICKLAND
MECHANISM FOR HANDLING BRICK MOLDS
Original Filed Oct. 6, 1919  9 Sheets-Sheet 9
1,529,452
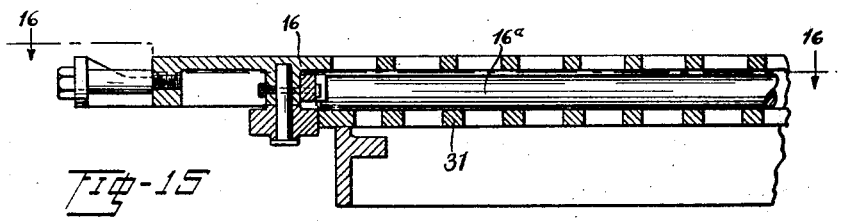
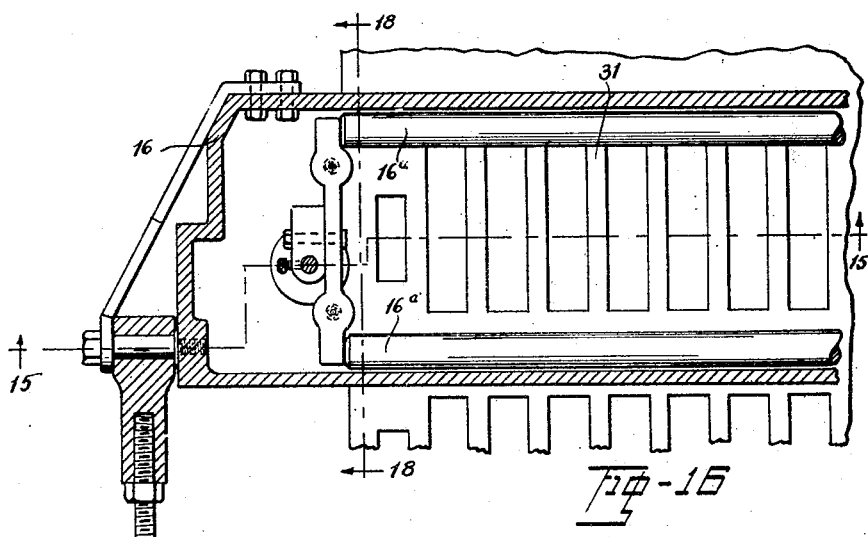
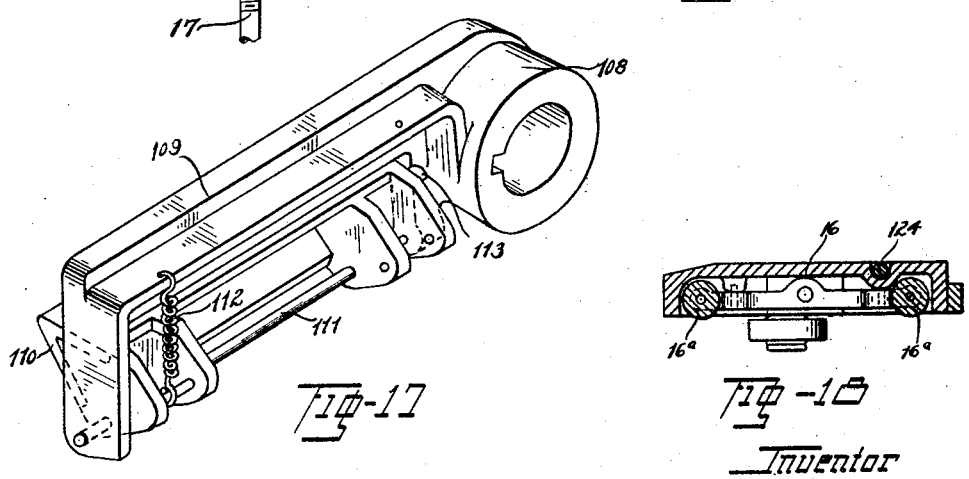
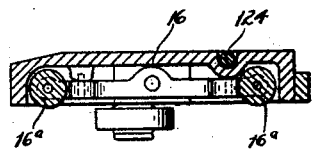
Inventor
D. J. Strickland
By Hull Smith Brock & West
Atty's Patented Mar. 10, 1925.

1,529,452

UNITED STATES PATENT OFFICE.

DAVID J. STRICKLAND, OF CLEVELAND, OHIO, ASSIGNOR, BY MESNE ASSIGNMENTS, TO THE GUARDIAN SAVINGS & TRUST COMPANY, OF CLEVELAND, OHIO, A CORPORATION OF OHIO.

MECHANISM FOR HANDLING BRICK MOLDS.

Application filed October 6, 1919, Serial No. 328,770. Renewed June 30, 1924.

*To all whom it may concern:*

Be it known that I, DAVID J. STRICKLAND, a citizen of the United States, residing at Cleveland, in the county of Cuyahoga and State of Ohio, have invented a certain new and useful Improvement in Mechanism for Handling Brick Molds, of which the following is a full, clear, and exact description, reference being had to the accompanying drawings.

This invention relates generally to brick machines and more particularly to that class of machines wherein the molds are filled with clay, carried to a point where the bricks are separated from the mold and the resanded mold again carried to the filling station thereby permitting continuous operation of the machine.

The objects of the present invention are to provide improved means for loosening the bricks in the molds; to provide an improved sanding mechanism for sanding the molds before they are again filled with clay; to provide a novel and improved mold turning mechanism; to provide a novel form of mechanism for feeding the molds under the filling station, receiving them after filled and transferring them to a conveyor. Further objects and advantages of the invention will appear as the description proceeds.

With these various objects in view, the invention consists in the various novel features of construction and in the manner of combining or arranging the various novel details, all of which will be fully described hereinafter and set forth in the appended claims.

Figure 1:
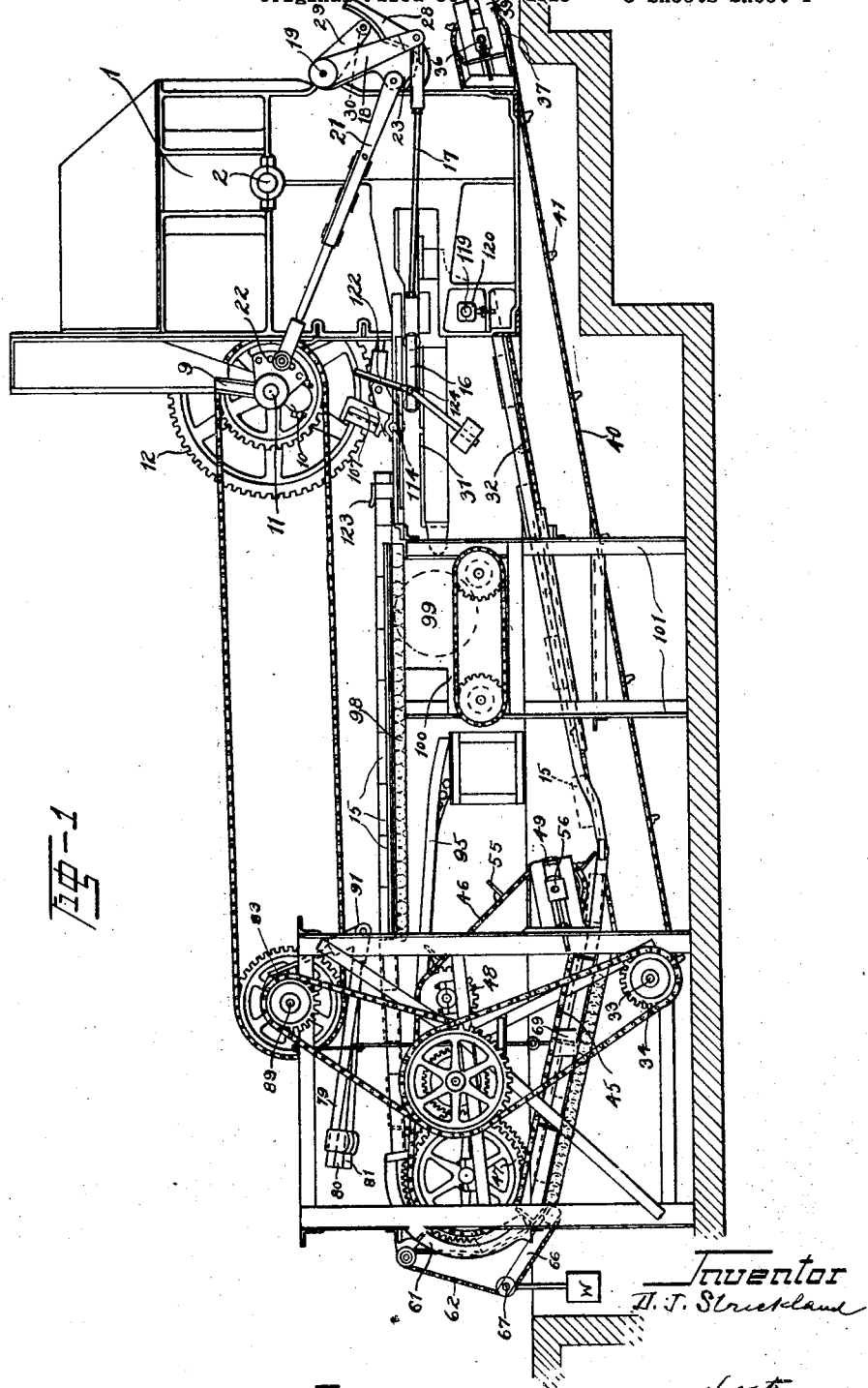
Figure 2:
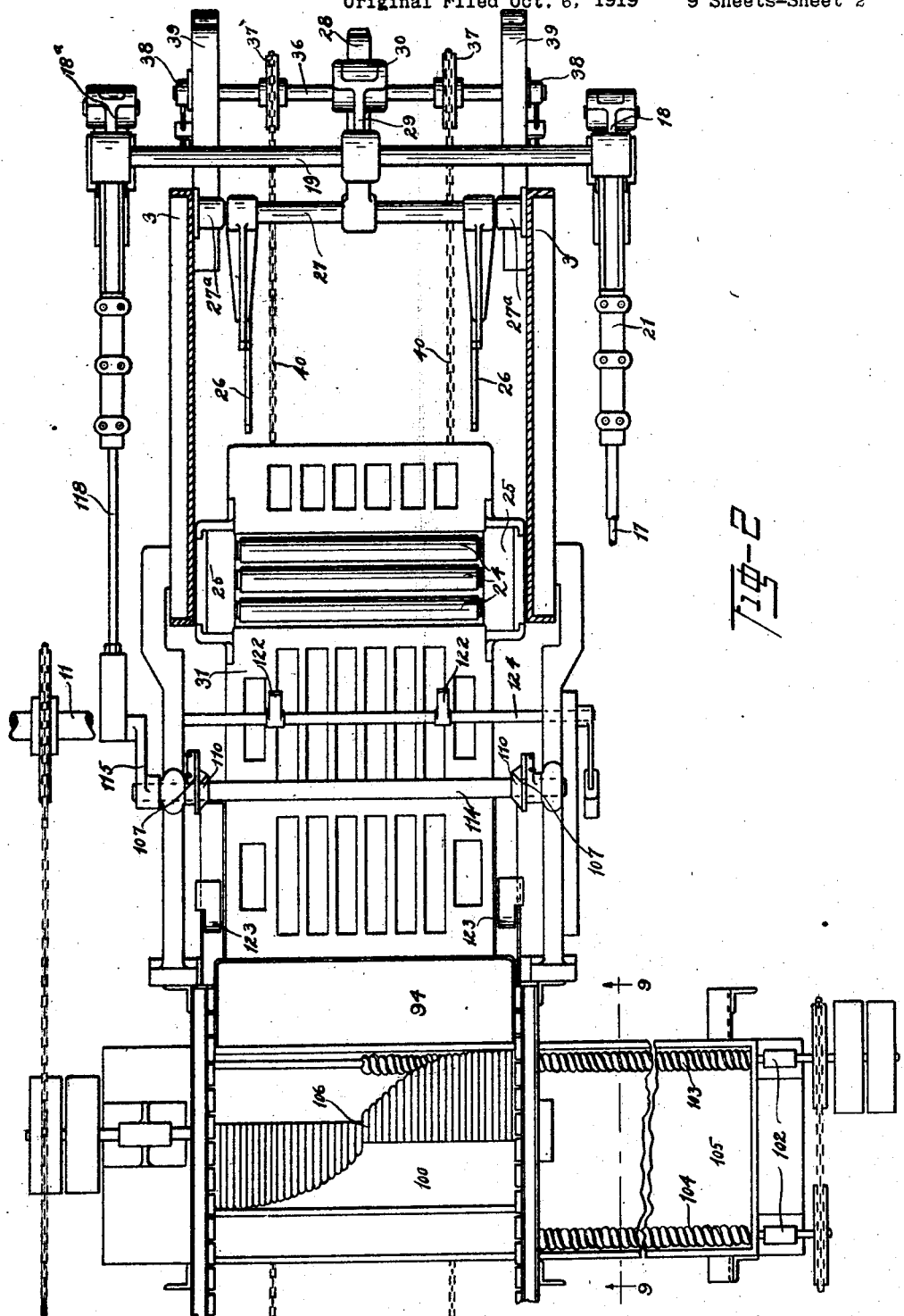
Figure 3:
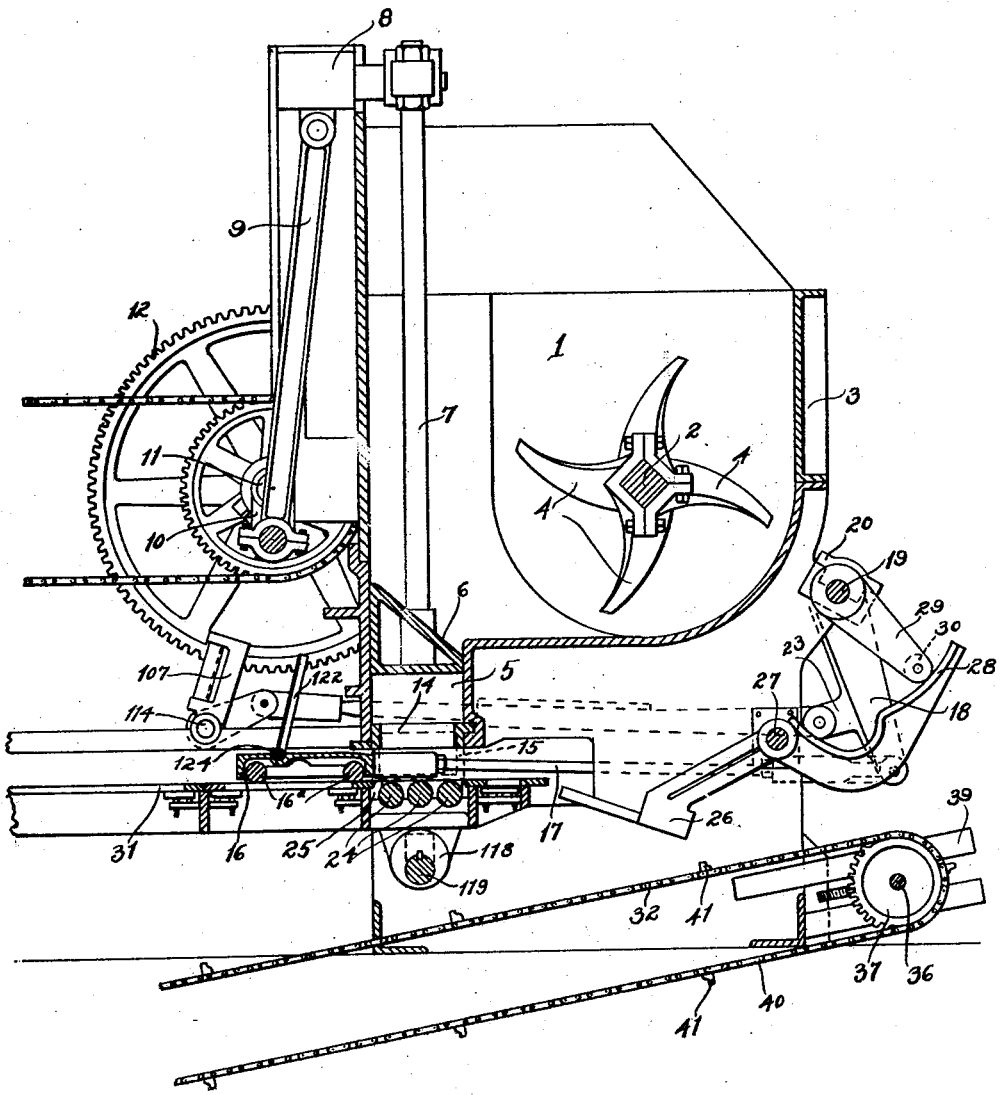
Figure 4:
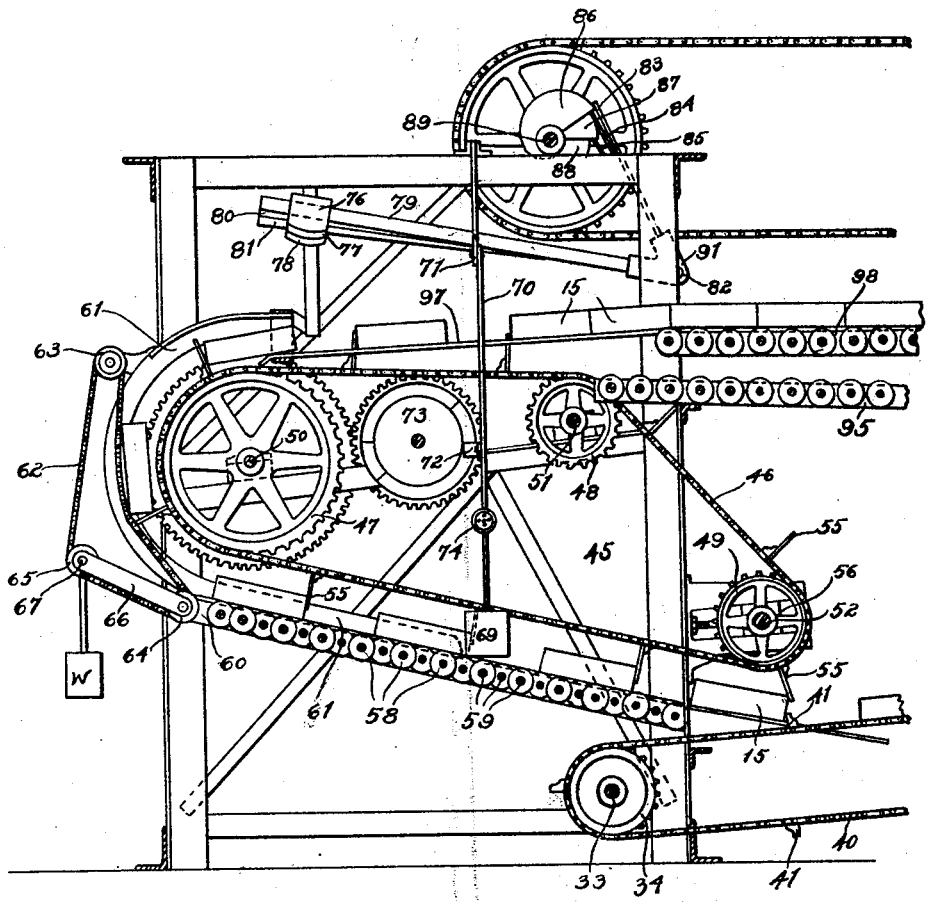
Figure 5:
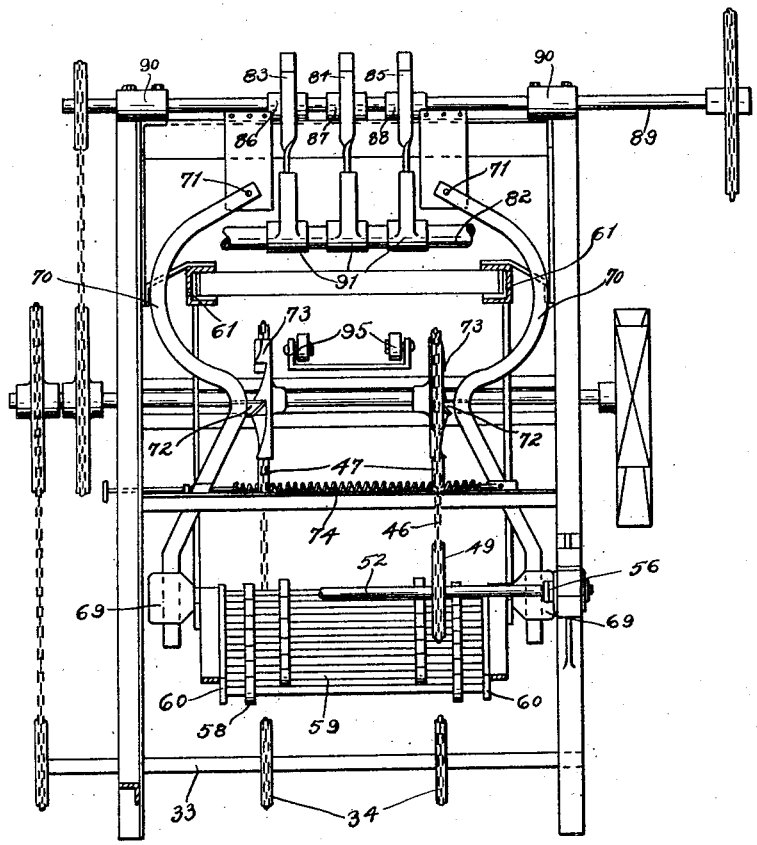
Figure 13:
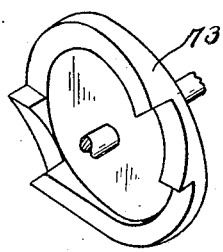
Figure 10:
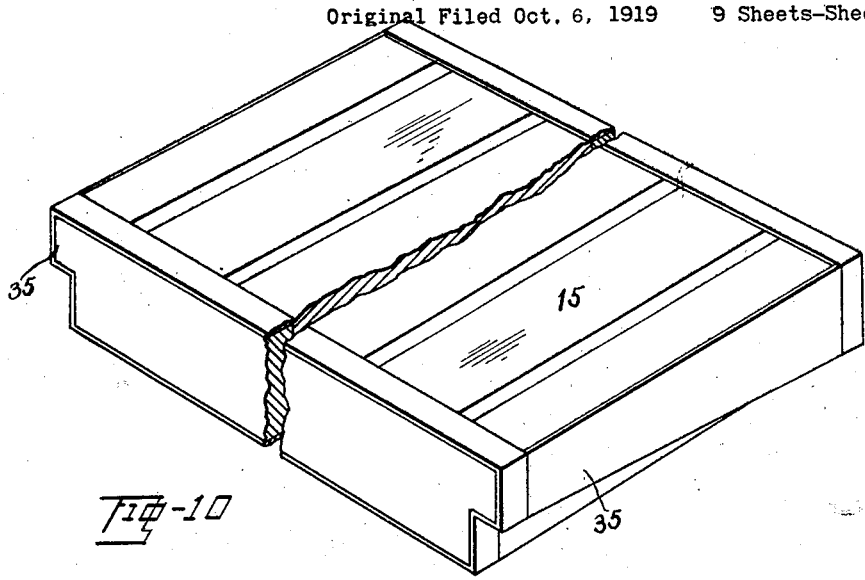
Figure 11:
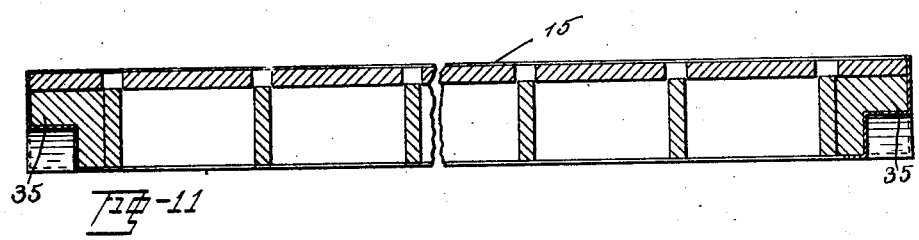
Figure 12:
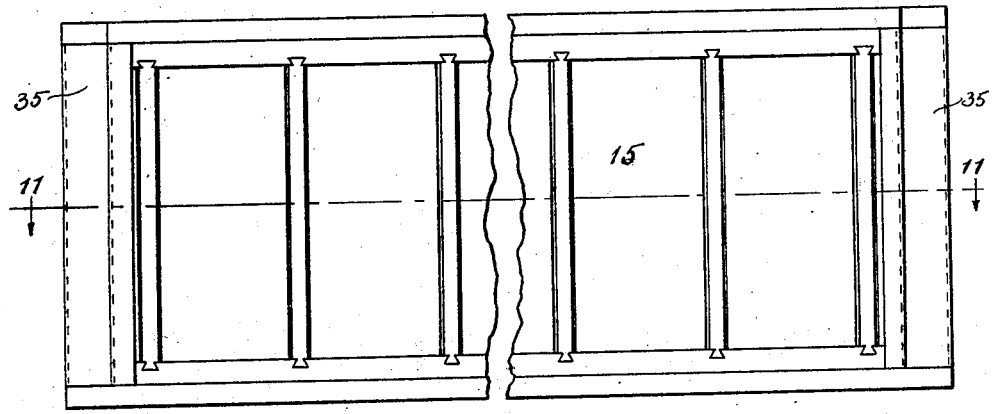

In the accompanying drawings wherein I have shown an illustrative embodiment of my said invention, but without intent to limit myself thereto, Fig. 1 is a side elevation of a complete machine; Fig. 2 is a top plan view with parts broken away showing the mold sanding and mold filling mechanism of the machine; Fig. 3 is a side elevation, with parts broken away, showing the pug mill and mold filling station; Fig. 4 is a side elevation with parts broken away showing the mold disengaging mechanism; Fig. 5 is an end view of Fig. 4 with parts broken away to show more clearly the mold tapping mechanism; Fig. 6 is a top plan view of the mold disengaging end of the machine; Fig. 7 is a section on the line 7—7 of Fig. 8; Fig. 8 is a top plan view of the sanding mechanism, with parts broken away to show the sanding box and sand feed therefor; Fig. 9 is a section on the line 9—9 of Fig. 2; Fig. 10 is a perspective view of one of the molds; Fig. 11 is a section taken on the line 11—11 of Fig. 12; Fig. 12 is a top plan view of one of the molds; Fig. 13 is a perspective view of one of the cams for operating the side mold tappers; Fig. 14 is a section taken on the line 14—14 of Fig. 9, showing how the conveyor rollers are fastened to the frame; Fig. 15 is a section taken on the line 15—15 of Fig. 16; Fig. 16 is a section taken on the line 16—16 of Fig. 15; Fig. 17 is a perspective view of one of the arms for turning the molds right side up before passing under the filling station; and Fig. 18 is a section on the line 18—18 of Fig. 16.

In carrying out my invention, I employ a horizontal pug mill 1 which has a shaft 2 journaled in suitable bearings in a casing 3 and carries the mixing and clay advancing knives 4 thereon. The clay is discharged through a suitable opening 5, by means of a plunger 6, which is mounted on a vertical shaft 7 fastened to a cross head 8. This cross head is reciprocated by the pitman 9 which is connected to a crank 10 rigidly mounted on the main driving shaft 11, which has at its outer end the driving gear 12 to which any suitable driving mechanism may be connected. At the lower end of the discharge opening 5 there is positioned a die 14 through which the clay is discharged into the mold 15 shown in dotted lines in Fig. 3.

A carriage 16, mounted on rollers 16ª is reciprocated on a table 31 by means of the adjustable arms 17 which are connected to cranks 18—18ª, which are rigidly mounted on the ends of a shaft 19 journaled in suitable bearings 20—20 on the casing 3.

The shaft 19 is oscillated by means of the pitman 21 which is adjustably connected at its upper end to a crank 22 rigidly mounted on the main driving shaft 11, and connected at its lower end to a projection 23 on the crank 18.

The molds are pushed over the rollers 24 (Fig. 3) mounted in the mold table 25, by the carriage 16 and are received by the arms 26. These arms and a cam 28 are rigidly fastened on a shaft 27 which is journaled in suitable bearings 27ª on the casing 3. An arm 29 rigidly connected at one end to the oscillating shaft 19 and carrying a roller 30 at its other end cooperates with the cam to oscillate the shaft 27, thereby moving the arms 26 upwardly to receive the molds and downwardly to discharge the molds on the conveyor 32.

The conveyor 32 is inclined downwardly towards the rear of the machine, and at the lower end there is a shaft 33 journaled in suitable bearings on the supporting frame, upon which the sprocket wheels 34 are rigidly mounted, and at the upper end the shaft 36, carrying sprocket wheels 37, is adjustably mounted in the bearings 38 which are slidable along the guide members 39 to adjust the tension of the chains 40 threaded over said sprocket wheel and which carry the mold engaging lugs 41.

Supported above the lower end of the conveyor 32 and upwardly inclined toward the rear end of the machine, is the mold turning conveyor 45, as shown in Figs. 1, 4 and 6.

This conveyor consists of a pair of chains 46—46 equipped with mold engaging lugs 55 and each chain engages a series of sprocket wheels 47—47, 48—48 and 49—49 which are rigidly mounted on shafts 50, 51, and 52, respectively. The shaft 52 is journaled in the adjustable sliding bearings 56 in order to regulate the tension of the chains. A plurality of rollers 58 arranged in staggered position and mounted on shafts 59, which are journaled in the side members 60, are positioned directly beneath the conveyor 45 and serve to support the molds as they are pushed along by the lugs 55.

A pair of side arms 61 are disposed along the side and rear end of the conveyor and serve to limit the end movement of the molds, and guide them along the rollers and around the sprocket wheels 47. A pair of guide chains 62, each threaded about a set of shives 63, 64 and 65 serve to keep the molds against the conveyor chains 46—46 while traveling about the sprocket wheels 47. The shives 65 are mounted on a shaft 67 which is journaled in a pair of pivoted arms 66 and a weight W hung from this shaft keeps the proper tension on the guide chains. A platen is positioned on each mold, by hand, as it passes from the lower end of conveyor 32 to the conveyor 45, so that when the bricks are disengaged from the molds they will be received on the platen.

As the molds are traveling up the conveyor 45, a pair of mold tappers alternately engage the ends of the molds to loosen the bricks therein. These tappers are in the form of weights 69—69 supported on the arms 70—70 which are pivoted to the frame work of the machine at 71—71. The arms are bent inwardly at their central portion and each carries a lug 72 which engages a cam 73 for actuating the arms which are connected by adjustable spring tension means 74.

When the molds reach the inverted position, after passing about the sprocket wheels 47, they are tapped on their bottoms by a series of alternate tappers 76, 77, 78, mounted on the arms 79, 80, 81, respectively. These arms are connected to suitable bearings 91—91—91 journaled on the shaft 82 which is fastened to the frame work of the machine, and each bearing 91 carries a shorter arm 83, 84, 85, engaging the cams 86, 87, 88, respectively, which are rigidly fastened to the shaft 89, journaled in bearings 90 on the frame work of the machine. By the above desired mechanisms, the bricks are disengaged from the mold and deposited upon the platen, which are pushed along to the conveyor 95 which guides them to a suitable baking oven (not shown), while the molds are pushed up a runway 97 which leads to the conveyor 98. This conveyor carries the molds across to the sanding mechanism 99 and thence to a table where the molds are turned right side up.

The sanding mechanism, as shown in Figs. 1, 2, 7, 8 and 9, consists of a box 100, supported under the conveyor 98 by suitable legs 101, and journaled in the bottom of this box in bearings 102 are the screw members 103—104 for feeding the sand from the reservoir 105 to the revolving splasher 106. The screw 103 extends midway of the box 100 so as to feed sand to the forward half of the splasher, while a screw 104 extends to the end of the box and feeds sand to the rear half of the splasher.

The empty molds are carried by the conveyor 98 to the table 94 where a pair of upsetting arms 107 engage the ends of the molds and turn them right side up on the carriage 16. A detail of the upsetting arms is shown in Fig. 17, wherein 108 is the hub portion which is rigidly mounted on a shaft 114, 109 a bracket formed integral therewith, and 110 a mold engaging member which is mounted on a shaft 111 extending through the bracket engaging member and into the hub portion. A spring 112 tends to keep the stop 113 on the engaging member up against the bracket and hold them in operative relation.

In operation, the mold 15, Fig. 10 is positioned on the table 94 upside down and the arms 107 are operated by the shaft 114 connected by the crank 115 to the pitman 118 which is connected to a projection on the crank 18ª. The arms drop downwardly and the members 110 engage the projections 35 on the ends of the mold. The arms are now rocked upwardly, in engagement with the mold and turning it right side up to allow it to drop on the counter-balanced receiving arms 122 which are rigidly fastened to a shaft 124 journaled in suitable bearings in the carriage 16, and position the molds on the carriage which is in its forward position. The molds are fed under a pair of brackets 123 before being positioned on the table so that the mold being turned by the arms 107 will not interfere with the molds immediately following it or throw it out of position. As the carriage travels rearwardly the mold is pushed off the carriage by contact with the shaft 114, and drops down in front of the carriage. As the carriage moves forward the mold is pushed under the die 14 where it is again filled and the operation is continued as previously described.

The mold table 25 is supported on the cams 118 which are rigidly mounted on a shaft 119. The ends of the shaft are supported in the adjustable bearings 120 and by rocking this shaft by hand, the table may be dropped downwardly to permit inspection of the die and the removal of stones or any foreign matter that may become jammed in the machine at this point.

From the foregoing description taken in connection with the accompanying drawings, it will be seen that I provide a combined mechanism usable in the plunger type of brick machine, and which will receive the bricks in the mold, separate the bricks and mold, resand the mold and return said resanded mold to the brick machine, while the bricks upon their pallets are directed off to one side towards the drying and baking devices.

Having thus described my invention, what I claim is:—

1. In a brick machine, the combination with a pug mill adapted to fill a series of molds fed thereunder, of a pair of arms adapted to receive said filled molds and deliver them to a conveyor, a second conveyor for receiving said filled molds and upsetting them and means engageable with said molds before and after upsetting whereby the bricks are loosened therein.

2. In a brick machine, the combination with a conveyor for inverting the filled molds, of a plurality of members for tapping the ends of the molds and a plurality of members for tapping the bottoms of the molds.

3. The combination with a pug mill die and platten, of a series of molds, means for receiving a mold for the platten, a conveyor to which said mold is transferred, means for upsetting said mold, means for engaging the ends of said molds before upsetting and means for engaging the bottoms of said molds after upsetting.

4. In a brick machine, the combination with a pug mill, of a table for receiving the empty inverted molds, a pair of arms mounted on said table and engageable with the ends of a mold to turn it right side up, a carriage for receiving said molds and means interposed between said arms and said carriage for receiving and positioning the mold on the carriage.

5. In a brick machine, the combination with a table for receiving the empty inverted molds, of a pair of clamping members mounted on said table between which the molds are adapted to be fed and means for inverting said molds and delivering them right side up on a carriage.

6. In a brick machine, the combination with a conveyor for feeding the empty molds to a table, of a receptacle disposed beneath said conveyor, means for feeding sand to the front end of said receptacle, means for feeding sand to the rear end of said receptacle and a member rotatable on said receptacle for splashing sand against the under side of the molds on said conveyor.

7. In a brick machine, the combination with an upwardly moving conveyor for inverting the molds, of a plurality of mold supporting rollers journaled beneath said conveyor, and flexible yieldable means engageable with said molds for holding them against said conveyor.

8. In a brick machine, the combination with a mold table, of a pair of mold turning arms swingable about an axis parallel with said table, said arms comprising a bracket portion and a mold engaging portion and means for holding said mold engaging portion in operative relation to said bracket portion.

9. In a brick machine, the combination with a mold table, of a carriage adapted to receive a mold, a pair of counterbalanced arms mounted on said carriage for positioning the mold thereon and means for reciprocating said carriage along said table.

10. A brick machine including a pug mill plunger, and die, a mold, means for positioning said mold beneath said die, means for receiving said filled mold, a conveyor to which said mold is transferred, means for elevating and turning said mold and means for agitating said mold while being elevated and reversed, means for separating the empty mold from its pallet, means for sanding said mold, and means for reversing said sanded mold and delivering the same for positioning beneath the die.

11. In a device of the kind described, the combination with a sand box comprising two compartments, of a conveyor extending through one compartment into its other compartment, a second conveyor extending the length of one compartment and a rotary distributor in the other compartment, and means for moving said conveyors and distributor.

12. In a device of the kind described, the combination with a plunger, die and mold, of a mold support, means for pushing said mold from said support, a pair of arms for receiving said mold, means for rocking said arms, and a conveyor beneath said arms and upon which the mold is deposited.

13. In a device of the kind described, the combination with a table adapted to receive a sanded mold, of means for engaging and reversing said sanded mold, and means for retarding the completion of the reversing movement.

14. In a device of the kind described, the combination with a table adapted to receive a sanded mold, of means for engaging and reversing said mold, a movable carriage for receiving said reversed mold, and means operable in connection with said carriage to move said mold from said carriage, said carriage serving to push one mold in place while moving to receive another mold.

15. In a device of the kind described, the combination with a mold, of a conveyor for the same, and means for tapping the bottom of said mold while in transit in order to dislodge the bricks.

16. In a device of the kind described, the combination with a mold, of a conveyor for the same, means for engaging the ends of the mold, and means for tapping the bottom of the mold, to dislodge the bricks.

17. The combination with a table to receive sanded molds, means for engaging and reversing said molds, a reciprocating carriage for receiving and positioning said molds, and stationary means for moving said molds from said carriage.

18. In a device of the kind described, the combination with a reciprocating carriage, of a stationary member, above said carriage and means for placing a mold upon said table at its forward movement, said stationary member stripping said mold from the carriage upon its rearward movement, the next forward movement of carriage pushing said stripped mold beneath a die.

19. In a device of the kind described, the combination with a reciprocating carriage of yieldable means carried by said carriage, a stationary stripping means above said carriage and means for placing a sanded mold upon said carriage.

In testimony whereof, I hereunto affix my signature.

DAVID J. STRICKLAND.